Feb. 4, 1930.  H. G. TAYLOR ET AL  1,745,817
OSCILLOGRAPH
Filed March 19, 1928
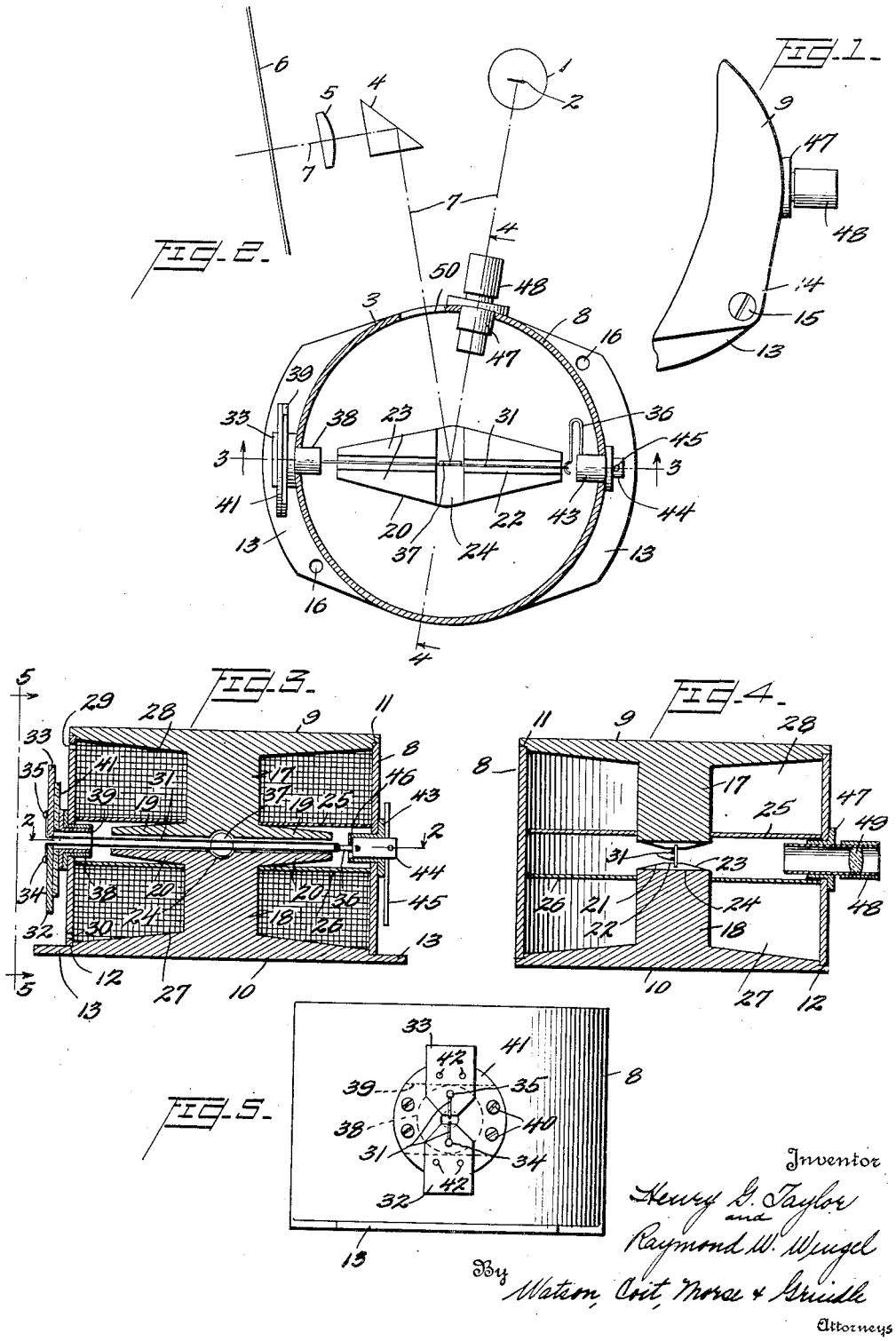

Patented Feb. 4, 1930

1,745,817

UNITED STATES PATENT OFFICE

HENRY G. TAYLOR AND RAYMOND W. WENGEL, OF BEAUMONT, TEXAS, ASSIGNORS TO GEOPHYSICAL EXPLORATION COMPANY, OF BEAUMONT, TEXAS, A CORPORATION OF DELAWARE

OSCILLOGRAPH

Application filed March 19, 1928. Serial No. 262,937.

This invention relates to oscillographs and more particularly to that element thereof containing a movable loop which oscillates in accordance with the amount and frequency of a small electric current flowing through the loop.

It is not proposed that the instrument, which is the subject matter of this invention, involve any basic principles which are not embodied in similar instruments now on the market. But it has been found that, in certain work and investigations where the use of an oscillograph is essential, various types of instruments procurable on the market are not suitable chiefly on account of their complicated structure and inconvenient size.

Of late, considerable geological research has been conducted, involving principles of seismology, wherein the character of various substrata in the surface of the earth has been accurately determined. This work has been effected generally by directing through the earth, within the area under investigation, artificial waves, created, for instance, by means of a blast of dynamite or other explosive. At several distant observation stations these waves, transmitted through the earth, are picked up and recorded by suitable equipment.

A very essential part of this equipment at the observation station is an oscillograph which records the receipt of a signal sent out electrically at the scene of the blast at the very instant of detonation of the charge. The instant of the blast is recorded photographically, and, when properly coordinated with other necessary data, forms the basis of calculations from which the desired information is derived.

In work of this nature, it will be appreciated that, to be practical, the equipment at an observation station, must of necessity, be simple, portable, and yet highly sensitive and accurate. The major recording instrument described and claimed in copending application Serial No. 262,936, filed March 19, 1928, and of which the oscillograph here disclosed is but one of several mechanisms, is entirely contained within a casing about ten inches square and two and one half inches deep. It follows therefore, that oscillographs of the types now on the market are totally unsuited for work of this nature.

With the foregoing in view, it is the aim of this invention to provide a galvanometer element which is simple and compact by virtue of its structural features, but which is yet as sensitive and accurate as other instruments many times its size.

It is a further object to provide a galvanometer element all the operative parts of which are contained in a short cylindrical casing, the casing itself forming an essential part of the entire element.

It is a further object to provide means mounted on the casing to properly focus a reflected ray of light on a sensitized strip.

It is yet another object of the invention to provide novel means by which the movable loop of the element may be adjustably supported by the casing.

Other objects and features of novelty of the invention will be apparent from the description when considered in connection with the drawings, in which:

Fig. 1 is a fragmentary plan view of the galvanometer element;

Fig. 2 is a horizontal section taken on the line 2—2 of Fig. 3 with the upper magnet of the galvanometer element removed; and diagrammatically showing the recording apparatus;

Fig. 3 is a vertical section taken on the line 3—3 of Fig. 2 looking in the direction of the arrows;

Fig. 4 is a vertical section taken on the line 4—4 of Fig. 2 looking in the direction of the arrows; and Fig. 5 is an elevation looking toward the right in Fig. 3.

The measuring and recording apparatus as a whole, comprises the lamp 1 having a horizontal filament 2, the galvanometer element indicated generally as 3, a reflecting prism 4, a condensing cylindrical lens 5, and the movable film 6. All the parts just mentioned are enclosed in a suitable casing, and film 6 is provided with some suitable motive power so that the film is moved at a substantially constant rate of speed through the path of the ray of light whch is indicated by the dot and dash line 7.

The operative parts of the galvanometer element are contained within the vertically disposed cylindrical casing 8. Mounted on either end of the cylindrical casing 8, are the disk-like closure members 9 and 10, which are provided with shoulders 11 and 12 to form seats for the ends of the cylindrical casing 8. The lower closure member 10 may be considered as a base and is provided with the laterally projecting flanges 13. The upper closure member 9 is provided at diametrically opposite points with laterally extending ears 14 which project beyond casing 8 and overlie flanges 13. Ears 14 contain counter-sunk drill holes to accommodate screws 15. Screws 15 are slightly longer than the length of the cylindrical casing 8, and are inserted in the drill holes in the cover and pass downwardly along the outside of the casing 8 and screw into base flanges 13 in holes 16. It will be seen therefore, that by means of the horizontally extending flanges 13, ears 14 and screws 15, the casing 8 and upper and lower closure members 9 and 10 are securely held together.

Mounted on the closure members 9 and 10 and extending inwardly therefrom, are the cylindrical core pieces 17 and 18. Each core piece is provided on its end with an elongated radially extending pole piece or face member as 19 and 20. From an inspection of Fig. 3 it will be seen that the pole pieces 19 and 20 taper gradually as they approach the casing 8. The horizontal configuration of the pole pieces is clearly disclosed in Fig. 2, and it will be seen that the lower pole face 20 has the appearance of an elongated hexagon. The upper face of the pole piece 20 has the appearance generally of an inverted V as shown at 21 in Fig. 4. The extreme upper surface of the pole piece 20 is horizontal as at 22, and slopes off gradually towards the edge as shown at 23 in Fig. 4. The lower surface of the upper pole piece 19 is the same as the upper surface of lower pole piece 20, and therefore needs no further description.

In each pole piece there is provided a transversely disposed cut-out portion 24, the purpose of which is to accommodate the oscillation of a mirror mounted on a conductor loop, and to allow the admission and reflection of the ray of light to and from the mirror carried by the loop.

Mounted on the cylindrical core members 17 and 18, secured thereto and to the back side of the pole pieces 19 and 20 respectively, are thin partition disks 25 and 26 which are preferably made of brass. These disks in conjunction with the associated core members and the upper and lower closure disks provide spools 27 and 28 on which are wound the enameled wire coils to provide a magnetic field. The inner ends of the wires of the coils are grounded respectively to core members 17 and 18. The coils, represented by the conventional cross-hatching shown in Figure 3, are wound on the cores in opposite directions to give the poles opposite polarity. The outer ends of the coils extend through notches 29 and 30 which are located in the upper and lower edges of the cylindrical casing 8. The windings of the cores are connected in parallel, and after passing through a suitable switch box the outer ends of the coil wires are secured to one terminal of a suitable battery. As the inner ends of the coil wires are grounded to the core members 17 and 18, it is necessary that the other terminal of the battery be grounded somewhere on the casing 8 or its associated parts.

Suspended between the pole faces 19 and 20 and lying in a vertical plane, is the conductor loop 31, the ends of which are soldered to terminal plates 32 and 33 at 34 and 35. The looped end of the conductor is supported by a spring 36. Mounted on the loop and in the center thereof, is the mirror 37.

Important features of the invention are the means by which the ends of the loops are adjustably supported.

Having particular reference to Figs. 3 and 5, projecting into casing 8 and rigidly secured thereto is the sleeve 38. Seated in sleeve 38 and having a bearing fit therein is the flanged sleeve 39, which has secured thereto by suitable screws 40, a circular insulating disk 41. Secured on the outer face of the circular insulating disk 41 by rivets 42, are the terminal plates 32 and 33.

Inserted in the casing 8 and diametrically opposite to sleeve 38 is a flanged sleeve 43 which is likewise rigidly secured in casing 8. Mounted in sleeve 43 and having a bearing fit therein, is the cylindrical stud 44, having in its outer end an operating pin 45. To the inner end of the stud is secured spring 36. Sleeve 43 is provided at 46 with a suitable slot to allow for the attachment of spring 36 to the cylindrical stud 44.

From the foregoing, it will be seen that both bearings supporting the loop are held in place by the tension of spring 36, and further, that a slight rotation of stud 44 or sleeve 39 will effect a corresponding movement in the loop, and by these means, the position of mirror 37 in a vertical plane, when the instrument is at rest, will be insured. Further, it will be seen that, when spring 36 is detached from the looped end of conductor 31, the looped conductor 31, the mirror 37, terminal plates 33 and 35 and the associated bearing 39 may all be removed as a unit.

The casing 8 is provided with a suitable lens holder which comprises a sleeve 47 rigidly secured to the casing. Slidably mounted in sleeve 47 is the tube 48 containing a double convex lens 49. The purpose of lens 49 is to insure the proper focusing of the image of the horizontal filament 2 on film 6.

Immediately adjacent the lens holder 48 is a second opening in the casing at 50 to permit the reflection of the image of filament 2 from the mirror 37.

The core pieces 17, 18, the closure members 9 and 10 and the casing 8 must be of some suitable magnetically permeable material. As the cross sectional area of the various parts of the magnetic path should be the same, the wall of casing 8 should have a certain thickness compared to the diameter of cores 17 and 18, and the closure members 9 and 10 should be thicker nearer the center than at the edges. The pole faces should be as near together as possible, since the intensity of the magnetic field decreases rapidly as the air-gap increases. The present instrument provides an air-gap of one-sixteenth of an inch.

The operation of the device is believed to be obvious.

The signal to be recorded on film 6 is received by some suitable signal receiving apparatus. As the voltage set up in said apparatus is generally too high, the current coming therefrom must be sent through a transformer, not shown, to reduce the voltage and increase the current. Conductors leading from the transformer are secured suitably to terminal plates 32 and 33, and the current thereby passes through the loop.

As the mirror 37 oscillates in response to the strength and frequency of the current passing through the loop, a ray of light coming from horizontal filament 2 passes through lens 49 to mirror 37, and is reflected by the mirror through opening 50 in the casing and into the reflecting prism 4. When the image of filament 2 is before the condensing lens 5, it has the form of a horizontal line. It is therefore necessary to insert the condensing lens 5 to reduce this line to a single point for proper registration on film 6.

The apparatus just described registers amplitudes of one quarter of an inch on film 6 in response to radio signals which are only moderately loud in head phones.

Having thus described the invention, what is claimed as new and desired to be secured by Letters Patent is:

1. In an oscillograph, a galvanometer element comprising a casing, closures mounted on the opposite ends thereof, core members formed integrally therewith and projecting therefrom and having on their ends pole pieces, and a looped conductor, lying between said pole pieces, secured to and supported by said casing.

2. In an oscillograph, a galvanometer element comprising a casing, closures mounted on the opposite ends thereof, co-axial core members projecting inwardly therefrom and having on their ends elongated transversely disposed pole pieces, a partition mounted on a core member adjacent the pole piece thereof, forming, in conjunction with the casing closure, a spool to accommodate a coil.

3. In an oscillograph, a galvanometer element comprising a cylindrical casing, a pair of axially disposed core members within said casing and formed integrally with the ends thereof, spaced pole pieces on the core members, and a looped conductor lying between the pole pieces, supported by the cylindrical wall of the casing, and disposed transversely with respect to the axis of said casing.

4. In an oscillograph, a galvanometer element comprising a cylindrical casing, disk-like closures mounted on the opposite ends thereof, co-axial, cylindrical core members projecting inwardly from said closures, and having elongated radially disposed pole pieces on the inner ends thereof, and a transversely disposed looped conductor lying between the pole pieces and adjustably secured to the casing whereby the plane of the loop may be adjusted.

5. In an oscillograph, a galvanometer element comprising a cylindrical casing, disk-like closures mounted on the opposite ends thereof, co-axial cylindrical core members projecting inwardly from said closures, and having elongated radially disposed pole pieces on the inner ends thereof, windings for said core members, spaced partitions mounted on the core members adjacent the respective pole pieces thereof, forming in conjunction with the casing closures, spools to accommodate said windings, and a looped conductor secured to the casing and disposed between the pole pieces.

6. In an oscillograph, a galvanometer element comprising a vertically disposed cylindrical casing, disk-like closures mounted on the opposite ends thereof, co-axial, cylindrical core members projecting inwardly from said closures and lying in the axis of the casing, elongated, radially disposed pole pieces formed on the inner ends of the core members, disks mounted on the core members adjacent the respective pole pieces thereof, windings for the core members lying between the disks and the closure members, a horizontally extending looped conductor, having mounted thereon a vertically disposed mirror, lying between the pole pieces and adjustably secured at its opposite ends to the casing.

7. The galvanometer element of claim 6 wherein the casing is provided with an opening having therein an adjustable sleeve containing a lens, to admit a ray of light to the reflecting mirror, and wherein the casing is provided, immediately adjacent said adjustable sleeve, with a second opening to permit the reflection of the light ray from the mirror.

8. In a galvanometer element, a casing, a movable loop securing and adjusting means comprising a sleeve fixed to the casing and projecting therethrough, a flanged sleeve having a bearing fit therein, an insulating member secured to the flanged sleeve, conducting plates mounted on said insulating member and having the ends of the loop secured thereto.

9. In a galvanometer element, a casing, a movable loop securing and adjusting means comprising a sleeve fixed to the casing and projecting therethrough, a cylindrical stud, having an operating pin on one end, disposed within said sleeve and having a bearing fit therein, a spring connected to the cylindrical stud and to the loop, whereby rotation of the cylindrical stud will effect an adjustment of the plane of the loop.

In testimony whereof I hereunto affix my signature.

HENRY G. TAYLOR.

In testimony whereof I hereunto affix my signature.

RAYMOND W. WENGEL.